United States Patent [19]

Foster

[11] 4,038,339
[45] July 26, 1977

[54] EPOXY-VINYL-POLYESTER COLD BLENDED RESIN COMPOSITION

[75] Inventor: Newton C. Foster, Pittsburgh, Pa.

[73] Assignee: Westinghouse Electric Corporation, Pittsburgh, Pa.

[21] Appl. No.: 613,841

[22] Filed: Sept. 16, 1975

[51] Int. Cl.$^2$ ............................................. C08L 63/00
[52] U.S. Cl. ..................................... 260/835; 260/836; 260/837 R; 428/418; 310/254
[58] Field of Search ......................................... 260/835

[56] References Cited

U.S. PATENT DOCUMENTS

| 2,691,007 | 10/1954 | Cass | 260/835 |
|---|---|---|---|
| 2,859,199 | 11/1958 | Parker | 260/835 |
| 3,052,647 | 9/1962 | Pietsch | 260/835 |
| 3,211,695 | 10/1965 | Peterson | 260/835 |
| 3,455,858 | 7/1969 | Taft | 260/22 |
| 3,523,143 | 8/1970 | Kwong | 260/835 |
| 3,524,901 | 8/1970 | Najvar | 260/835 |
| 3,557,246 | 1/1971 | Foster | 260/836 |
| 3,574,157 | 4/1971 | Markus | 260/28.5 |
| 3,882,187 | 5/1975 | Takiyama | 260/835 |
| 3,933,875 | 1/1976 | Brose | 428/413 |

FOREIGN PATENT DOCUMENTS

| 1,074,260 | 1/1960 | Germany | 260/835 |
|---|---|---|---|
| 1,811,590 | 6/1970 | Germany | 260/835 |

OTHER PUBLICATIONS

Epoxy Resins, Chemistry and Technology, May, Marcel Dekker, New York, 1973, pp. 522, 524, 528–529, 534 and 536.

*Primary Examiner*—Paul Lieberman
*Attorney, Agent, or Firm*—D. P. Cillo

[57] ABSTRACT

An epoxy-styrene-polyester solventless impregnating composition, having a long atmospheric catalyzed shelf life, is made by forming an unreacted admixture, at a temperature of between about 20° C to 35° C, consisting essentially of a liquid-solid epoxy resin mixture, liquid Nadic methyl anhydride, a liquid unsaturated reactive vinyl monomer, a polyester resin, a reaction catalyst and a reaction inhibitor.

8 Claims, 3 Drawing Figures

EPOXY-VINYL-POLYESTER COLD BLENDED RESIN COMPOSITION

BACKGROUND OF THE INVENTION

This invention relates to novel epoxy-styrene-polyester solventless resin impregnating compositions having excellent atmospheric catalyzed pot life, and the process for making such compositions. Foster, in U.S. Pat. Nos. 3,557,246 and 3,657,196, pre-reacted an epoxy resin and maleic anhydride to form a complex half-ester at about 85° C to 90° C. To the half ester; styrene, Nadic methyl anhydride, benzoyl peroxide, and hydroquinone reaction inhibitor were added. This provided a resinous impregnating composition having excellent electrical properties and a storage lifetime of up to about 2 months. The composition was produced by a complex reaction mechanism however, which made it difficult at times to maintain consistent batch uniformity.

Foster et al, in U.S. Pat. No. 3,919,348, solved problems of batch uniformity by conducting an essentially complete esterification reaction, at about 80° C to 100° C, between a liquid-solid epoxy resin mixture and maleic anhydride in the presence of a catalyst such as piperidine, pyridine, imidazole or tertiary amine; and then adding other ingredients such as styrene, and a nitrophenol stabilizer. As a final step a polycarboxylic anhydride and a peroxide or azo compound could be added.

Both of these compositions require hot blending of ingredients, to react the epoxy and anhydride, in order to produce a one-half or full esterification reaction. Such compositions require heating equipment for their manufacture. These systems do not allow small producers to buy the ingredients, and simply cold blend them in the quantities they need. What is needed, is a resin system that can be cold blended, to provide a solventless insulating composition having the properties of low viscosity at room temperature, ease of curing, good electrical resistivity, and long shelf life.

SUMMARY OF THE INVENTION

It has been found, that an epoxy-styrene-polyester resin impregnating composition, having long shelf life and excellent electrical properties, and which is particularly suitable for coating and impregnating large motor coil insulation, can be made by a cold blending process without an initial esterification reaction. This is accomplished by forming an unreacted admixture, at room temperature, i.e., between about 20° C to 35° C, consisting essentially of a: liquid-solid epoxy resin-liquid unsaturated reactive vinyl monomer mixture, liquid Nadic methyl anhydride, a polyester resin, a catalyst such as a peroxide or azo compound, and a reaction inhibitor such as a quinone compound.

The method comprises admixing 1 part of an epoxy resin combination, consisting of a liquid epoxy resin having an epoxy equivalent weight of between about 150 to 300, and a solid epoxy resin having an epoxy equivalent weight of between about 325 to 2,500, wherein the weight ratio of solid epoxy: liquid epoxy is between about 1:0.3 to 1:9, with: between about 0.3 to 0.7 part of liquid Nadic methyl anhydride, and between about 0.4 to 1.4 parts of a liquid vinyl monomer. Preferably, the vinyl monomer is mixed with the epoxy resins before the other ingredients are added, in order to help dissolve the solid epoxy and provide a solution of low viscosity.

Also included is an amount of a polyester resin effective to cross-link the vinyl monomer. The amount of polyester will be based on the amount of vinyl monomer present, and will range from a weight ratio of polyester: vinyl of between 0.2:1 to 1.0:1 with a preferred range of between about 0.3:1 to 0.6:1. These ingredients are admixed in the presence of effective amounts of a reaction catalyst and reaction inhibitor, generally between about 0.002 to 0.010 part of a peroxide or azo catalyst and between about 0.0001 to 0.0010 part of a quinone reaction inhibitor per 1 part vinyl monomer. This provides an essentially unreacted room temperature admixture having a viscosity of between about 50 cps to 2,500 cps at 25° C.

This solventless resin impregnating composition has many desirable properties, such as low cost, adhesiveness, chemical inertness, ease of curing, good electrical resistivity, and an atmospheric shelf life of at least 45 days at 25° C. While curing, little pollution problems are encountered. These properties make it especially suitable for coating, impregnating and encapsulating large electrical component insulation, such as motor stator coil insulation. This can be accomplished by insertion of the coil in the motor stator, and immersion of the motor in the composition. This operation would be commercially impractical if the large volume of impregnating composition did not have a pot life that would permit it to retain its low viscosity, and to be used repeatedly over a period of at least 45 days.

This system also eliminates critical and expensive heating and addition steps, by allowing a simple room temperature admixture of ingredients. Thus, small portions can be made easily and inexpensively, and the material need not be bought in bulk amounts with worry of gellation of unused quantities.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENT

Figure 2:
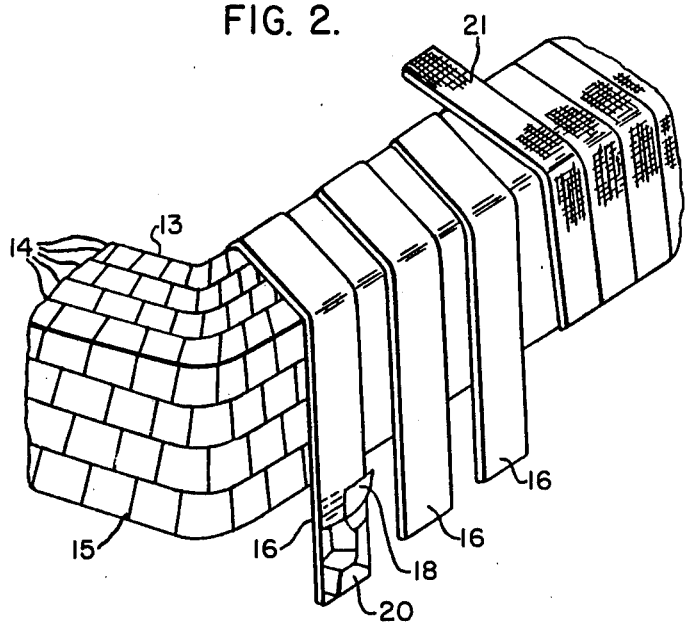
FIG. 2 shows a wrapped, resin-impregnated coil made in accordance with the instant invention.

The glycidyl polyether of a dihydric phenol (epoxy resin) which may be employed in the invention is obtainable by reacting epichlorhydrin with a dihydric phenol in an alkaline medium at about 50° C, using 1 to 2 or more moles of epichlorhydrin per mole of dihydric phenol. The heating is continued for several hours to effect the reaction, and the product is then washed free of salt and base. The product, instead of being a single simple compound, is generally a complex mixture of glycidyl polyethers, but the principal product may be represented by the structural chemical formula:

where n is an integer of the series 0, 1, 2, 3 . . . , and where R represents the divalent hydrocarbon radical of the dihydric phenol. Typically R is:

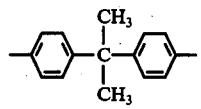

The glycidyl polyethers of a dihydric phenol used in the invention have a 1, 2 epoxy equivalent between 1.0 and 2.0 i.e., at least one 1, 2 epoxy group. By the epoxy equivalency, reference is made to the average number of 1, 2 epoxy groups:

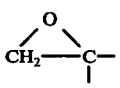

contained in the average molecule of the glycidyl ether. These glycidyl polyethers are commonly called bisphenol A type epoxy resins. Bisphenol A (p, p - dihydroxydiphenyldimethyl methane) is the dihydric phenol used in these epoxides. These bisphenol A epoxy resins can be in solid or liquid form, and their epoxy equivalent weight can range from about 150 to 2,500. Within this range there is a preferred range of from about 150 to 800. Thus, the epoxy resin mixture of this invention can comprise completely bisphenol A types. Use of resins having epoxy equivalent weights over about 2,500 present blending problems and may result in impregnating problems.

Typical epoxy resins of bisphenol A are readily available in commercial quantities and reference may be made to the Handbook of Epoxy Resins by Lee and Neville for a complete description of their synthesis, or to U.S. Pat Nos.: 2,324,483; 2,444,333; 2,500,600; 2,511,913; 2,558,949; 2,582,985; 2,615,007; and 2,633,458. The solid epoxy resins used in this invention should be high purity materials i.e., over about 99.5% free of residual reactive species such as amine catalysts or quarternary ammonium compounds used to upgrade or increase the molecular weight of the epoxy resins from the liquid to the solid state. Generally, the solid bisphenol A epoxy resins used in this invention will have an epoxy equivalent weight of between about 325 to 2,500 and the liquid bisphenol A epoxy resins used in this invention will have epoxy equivalent weight of between about 150 to 300.

Other glycidyl ether resins that are useful in this invention include polyglycidyl ethers of a novolac. The polyglycidyl ethers of a novolac suitable for use in accordance with this invention are prepared by reacting an epihalohydrin with phenol formaldehyde condensates. While the bisphenol A-based resins contain a maximum of two 1, 2 epoxy groups per molecule, the epoxy novolacs may contain as many as seven or more epoxy groups per molecule. In addition to phenol, alkyl-substituted phenols such as o-cresol may be used as a starting point for the production of novolac.

The product of the reaction is generally a massive oxidation resistant aromatic compound, one example of which is represented by the structural chemical formula:

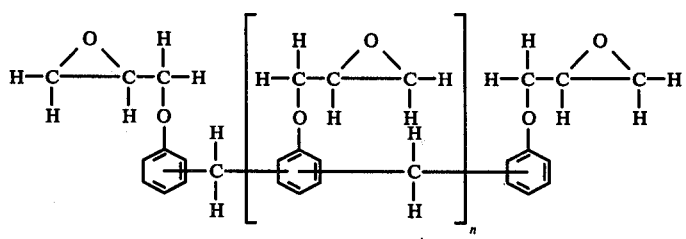

wherein n is an integer of the series 0, 1, 2, 3 etc.

Although novolac resins from formaldehyde are generally preferred for use in this invention, novolac resins from any other aldehydes such as, for example, acetaldehyde, chloraldehyde, butyraldehyde, fufuraldehyde, can also be used. Although the above formula shows a completely epoxidized novolac, other novolacs which are only partially epoxidized can be useful in this invention. These novolac resins can be in liquid or solid form, and their epoxy equivalent weight can range from about 150 to 500. Within this range there is a preferred range of from about 150 to 300. They may be used in admixture with the bisphenol A type epoxy resins in this invention.

With any of the epoxy resins used, if the ratio of solid epoxy: liquid epoxy is less than 1:0.3, i.e., very little liquid epoxy, the epoxy resins will be difficult to blend, and would require an excess, undesirable amount of vinyl monomer to reduce the viscosity to an acceptable impregnating range; if the ratio is greater than 1:9 i.e., excess liquid epoxy, the viscosity of the resin system will be too low for good adhesive bonding of motor coils, and the composition will not be able to handle much vinyl monomer. Also, if more than 9 parts of liquid epoxy, or an all liquid epoxy system is used, the impregnating system will run from the motor coils, after the motor, containing the impregnated coils in the stator sections, is placed in an oven to cure the impregnation system. The preferred ratio of solid epoxy: liquid epoxy in this system is between about 1:0.5 to 1:3. It is also essential, for motor applications, that the viscosity of the impregnating composition admixture be between about 50 cps to 2,500 cps at 25° C.

Nadic methyl anhydride is the only anhydride which will not react easily with the epoxy blend, and which is unreactive with the vinyl monomer in this particular resin system. The liquid Nadic methyl anhydride is effective to completely react with the epoxy resins at over about 135° C, at concentrations of between about 0.3 to 0.7 part for each 1 part of combined solid-liquid epoxy resin. The impregnating composition of this invention must delay epoxyanhydride reaction until the final curing stage, and rely upon a quick styrene-polyester gel, at about 85° C to 135° C, for resin retention within the impregnated coils during the curing step.

Styrene is an example of one of the liquid, addition polymerizable, monoethylenically unsaturated reactive vinyl monomers, and it is preferred because of its low cost and good dielectric and tensile properties on cure. Vinyl toluene is also suitable. These type vinyl monomers are free of functional groups reactive with the epoxy, but are effective to cross-link with the polyester to provide a quick gel.

The monomer will be a liquid in all cases to provide the needed fluidity for impegnation. The amount of monomer used must be effective to impart a short gel time to the impregnating composition. This amount will be about 0.4 to 1.4 parts for each 1 part of combined solid-liquid epoxy resin. Use of over about 1.4 parts may cause excessive dilution of the impregnating composition, and under 0.4 part will not supply enough monomer to provide sufficient gellation of the impregnating composition, in order to prevent runoff during curing after motor impregnation.

Polyester resin is used as an essential component in combination with the liquid vinyl monomer, to provide a short gel time for the impregnating composition. The polyester is critical in cross-linking the vinyl monomer to provide a composition that will not flow excessively before a final bake of the epoxy-anhydride cures the entire impregnating composition within the coil.

The weight ratio of polyester: vinyl must be between at least about 0.2:1 to 1.0:1 for effective cross-linking, with a preferred range of between 0.3 to 0.6 part polyester per 1 part vinyl. If a ratio of less than 0.2:1 is used, there will not be sufficient polyester to cross-link the monomer, which in turn will not provide enough linked polyester reactive species to cross-link the polyester-styrene with the epoxy during cure at temperatures over 135° C. This will result in a very cloudy very brittle cured system containing a large amount of unreacted polymers.

Polyesters can be produced by a variety of techniques including condensation of a polyhydroxy compound such as propylene glycol or diethylene glycol with a dicarboxylic acid such as maleic acid, fumaric acid, phthalic acid, isophthalic acid or adipic acid. Although any pure polyester will work in this invention, a particularly useful polyester for this impregnating system is a polyester of bisglycol and fumaric acid. Vinyl, acrylic, and polyester resins are well known commercially available materials and reference may be made to *Plastic Materials* by J. A. Brydson Ch 12, 13 and 21, herein incorporated by reference, for a complete description of their synthesis and properties.

A reaction catalyst is needed to help the polyester-vinyl gellation. Peroxide compounds are used as a free-radical type catalyst for this polymerization reaction. Useful catalysts of this type include, among others, the following catalytic peroxides: benzoylperoxide, dicumylperoxide, lauroyl peroxide, methyl ethyl ketone peroxide and preferably 2,5-dimethyl-2,5 bis(benzoylperoxy hexane), and mixtures thereof. Azo compounds, having the structural formula R—N=N—R where R can be alkyl or aryl, can also be used as the free radical type catalyst. Useful azo compounds include, among others: 2-(tert-butylazo) isobutryonitrile

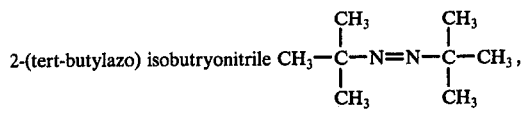

2-tert-butylazo-2,4-dimethylpentane and preferably 1-tert-butylazo-1-phenylcyclohexane.

The peroxide or azo catalyst or their mixtures must be effective to promote a gelling effect to the impregnating composition, at temperatures over about 85° C. The effective range of peroxide or azo catalyst is between about 0.002 to 0.010 part for each part of vinyl monomer. Above 0.010 part shortens the storage lifetime of the impregnating composition. Below 0.002 part causes very long gel times.

A reaction inhibitor is needed that is effective to react with the free radicals of the peroxides or azo compounds, to prevent a room temperature, i.e. about 20° C to 35° C, catalization reaction of the styrene and polyester. Suitable inhibitors are of the quinone type such as, for example, benzoquinone, hydroquinone and tertiary butyl hydroquinone. The quinone inhibitors must be effective to prevent gellation of the impregnating composition at room temperature during the cold blending. The effective range of quinone inhibitor is between about 0.0001 to 0.0010 part for each 1 part of vinyl monomer.

The preparation of the impregnating resin comprises addition of these ingredients in the critical ranges described above by simple cold blending at a temperature of between about 20° C to 35° C. Preferably, the epoxy resins and styrene are mixed first and then the other ingredients blended in. This provides a resinous impregnating composition having a viscosity of between about 50 cps to 2,500 cps at 25° C, and a shelf life of at least 45 days at 25° C. Upon heating in an oven to a temperature of between about 85° C to 135° C, the impregnating resin will gel in about 15 to 30 minutes. Upon further heating over 135° C, and generally between about 160° C to 175° C, the impregnating resin will completely cure to a thermoset state in about 6 to 30 hours.

In this method, there is no deliberate reaction at room temperature to form esters, half-esters or any other reaction product, and heat is not applied until the motor, with inserted coils, is baked to cure the insulation after impregnation, at which time the impregnating composition quickly gels to prevent resin runoff. Then, the motor with impregnated coils can be further baked to thermoset the resinous impregnant in the coils. Although the composition is characterized as "unreacted", it must be understood that very small quantities of epoxy will cross-link with anhydride after storage for several days.

The resinous compositions of this invention may be mixed with suitable solid fillers which are not a catalyst for the epoxy styrene-polyester mixture, such as hydrated alumina, and silica. These fillers preferably are used in finely divided form and may be used singly or in combination.

In the light of the examples hereinbelow, it will be obvious how to use the composition to produce a desired article. Although the system is particularly suitable as motor coil insulation, other articles can include potted or encapsulated electrical or electronic components or a casting.

As indicated heretofore, the epoxy-styrene-polyester, cold blended solventless resin impregnating varnish composition of this invention has an atmospheric catalyzed shelf life at 25° C of at least 45 days. Shelf life is defined by Lee and Neville in the *Handbook of Epoxy Resins*, as the time available for use of an epoxy system after the resin and curing agent are mixed. In motor coil impregnation applications requiring medium viscosity resins, shelf life generally ends at a viscosity of about 2,500 cp at processing temperatures, generally 25° C.

By a 45 day atmospheric catalyzed shelf life, as described in this invention, is meant: that the epoxy-styrene-polyester-anhydride-inhibited free radical catalyst composition of this invention will remain below 2,500 cps at 25° C and will not form a semi-solid gel upon exposure to air at 25° C for at least 45 days. The test to be used in determining shelf life in this invention is: the number of days required, for a sample of this composition to pass 2,500 cps over about 2,000,000 cps at 25° C, when placed in a test tube, open to air at 25° C.

Figure 1:
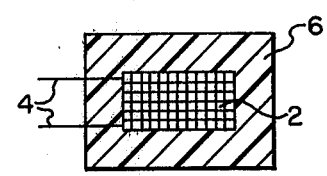
FIG. 1 shows an encapsulated electrical article made in accordance with the instant invention.

FIG. 1 shows an insulated electrical member such as a coil 2, which has leads 4, potted in a cured insulating casting 6, the casting being the resinous composition applied to the member. FIG. 1 is thus illustrative of certain articles of the invention, namely, electrical or electronic components potted or encapsulated in the composition of this invention.

The invention will now be described with particular reference to the preparation and impregnation of coils suitable for use in high-voltage motors. Referring to FIG. 2 of the drawings, there is illustrated a coil 13, comprising a plurality of turns of conductors 14. Each turn of the conductor 14 consists essentially of a copper or aluminum bar or wire wrapped with turn insulation 15. The turn insulation 15, preferably is prepared from a fibrous sheet or strip impregnated with a bonding resinous insulation. While the bonding resinous insulation may consist solely of a coating of uncured varnish or resin, it is preferred that it comprise a wrapping of fibrous material treated with a bonding resin. Glass fiber cloth, paper asbestos cloth or asbestos paper treated with a resin may be used with equally satisfactory results. The resin applied to the turn insulations to bond them together may be a phenolic resin, an alkyd resin, a melamine resin or the like, or mixtures of any two or more of these.

The turn insulation is not adequate to withstand the severe voltage gradients that will be present between the conductor and ground when the coil is installed in a high-voltage motor. Therefore, ground insulation for the coil is provided by wrapping one or more layers of micaceous insulation, such as mica paper or preferably a composite mica tape 16 about the turn 14. Such composite tape 16 comprises a pliable backing sheet 18 of polyethylene terephthalate mat, having a layer of mica flakes 20 bonded thereto by a liquid resinous binder. The tape may be applied half lapped, butted or otherwise. Generally, a plurality of layers of the composite tape 16 are wrapped about the coil with five or more layers generally being used for high voltage motor coils. To impart better abrasion resistance and to secure a tighter insulation, a wrapping of a tape 21 of a tough fibrous material, for example, glass fiber, asbestos or the like is applied to the coil.

Figure 3:
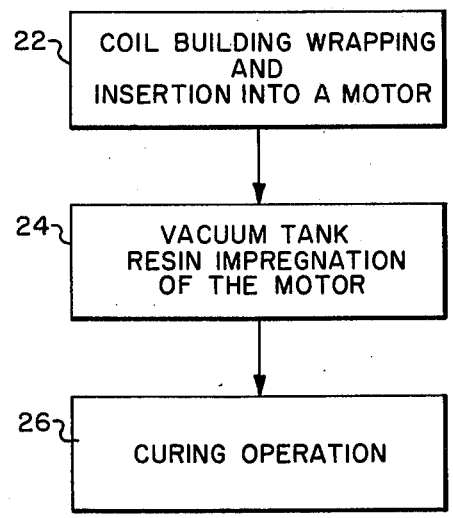
FIG. 3 is a flow sheet of the process for impregnating a coil.

In FIG. 3 of the drawings, there is a schematic illustration of the process steps which may be followed in preparing an insulated high voltage motor coil in accordance with this invention. The first step 22, comprises the building and wrapping of coils as described above and insertion into the stator portions of a motor. The motor is then introduced into a vacuum impregnating tank 24 and may be subjected to a heat drying and evacuating operation to remove substantially all moisture, air and other undesirable volatile material from the inserted coils. The polymerizable resinous composition of this invention is then introduced into the tank until the motor containing the coils is completely submerged in the composition.

While the motor is completely covered with the polymerizable resinous composition, atmospheric air or a gas such as nitrogen or carbon dioxide is introduced into the impregnating tank under pressure to assist the polymerizable composition in penetrating completely into the interstices of the coils within the motor stator and to assure substantially complete filing thereof. The impregnating treatment need not be of long duration. Ten minutes under pressure ordinarily is sufficient to completely impregnate and saturate small windings; longer impregnation periods, however, for example up to several hours or more, insure the most complete penetration and saturation of larger coils and windings. It will be understood that while vacuum impregnation produces the best results, ordinary immersions under atmospheric conditions will give good results.

The motor, containing the impregnated by uncured coils disposed in the stator sections is then withdrawn from the impregnating tank, drained briefly and subjected to a curing operation 26 at temperatures of up to about 175° C for 6 to 30 hours. Generally the motor is placed in a 160° C oven. After about 2 hours, the coils in the stator reach a temperature of about 85° C and the resin system impregnating the coils gels. After about 4 hours the coils in the stator reach a temperature of about 135° C and the resin system begins to cure. After about 7 hours the oven temperature of about 160° C is reached and the resin system is cured.

EXAMPLE 1

An epoxy-styrene-polyester solventless resin impregnating composition was prepared. A two component epoxy resin system was first made by mixing 5.0 parts of a solid low melting diglycidyl ether of bisphenol A, having a epoxy equivalent weight (E.EQ.WT.) of about 475 to 575, a purity of about 99.5%, and a Durran's melting point of about 70° C to 80° C (sold commercially by Dow Chemical Company under the Tradename DER-661) with 5.0 parts of a liquid diglycidyl ether of bisphenol A, having an epoxy equivalent weight of about 185-192 and a viscosity of between 10,000 cps to 16,000 cps at 25° C (sold commercially by Shell Chemical Company under the Tradename Epon 828). To this was added 8 parts of liquid styrene vinyl monomer. These components were well blended. The ratio of solid epoxy to liquid epoxy was 1:1 and the ratio of reactive vinyl monomer to total epoxy was 0.8 to 1. The styrene is added here to provide an epoxy solution where the styrene acts as a diluent for the epoxy resins.

The composition was maintained at 25° C. Then to the 18 parts of combined solid-liquid epoxy resin and styrene was added 5.9 parts of liquid Nadic methyl anhydride of about 99.5% purity; 0.048 part of 2,5 dimethyl-2,5-bis (benzoyl-peroxy hexane) reaction catalyst; and 0.002 part of tertiary butyl hydroquinone reaction inhibitor. This provided 0.59 part anhydride per 1 part total epoxy; and 0.006 part catalyst and 0.00025 part inhibitor per 1 part styrene.

To three samples of this cold blended admixture, each containing 23.9 parts of the above mentioned materials, was added, at 25° C: 0.6 part, 1.2 parts and 2.4 parts of a solid polyester of bisglycol and fumaric acid (sold commercially by Hercules Powder Co. under the Tradename Atlac 382) to form samples (A), (B) and (C) respectively. Sample (A) contained about 2.45 wt.% polyester, sample (B) contained about 4.76 wt.% polyester and sample (C) contained about 9.15 wt.% polyester. The weight ratio of polyester: styrene was 0.075:1; 0.15:1 and 0.30:1 for samples (A), (B) and (C) respectively. The viscosity of each of the samples was about 225 cps at 25° C.

Fifteen grams of each sample was poured into aluminum cups, gelled and baked in an oven at a minimal cure temperature of 135° C for about 10 hours. Sample (A) was cloudy and brittle, indicating large amounts of unreacted polymers of different refractive indexes, sample (B) was slightly cloudy and less brittle while sample (C) was clear and tough. This indicated that the epoxy, styrene, and polyester of samples (A) and (B) were not all cross-linked, and that the system of sample (C) was cross-linked. The results indicate that a sample containing about 0.30 part polyester per part styrene, would provide good polyester-styrene cross-linking and good epoxy linking with the polyester, to provide a clear, reacted system and that a sample containing 0.15 part polyester per part styrene would not.

Sample (C), containing 0.30 part polyester per part styrene, was about 0.125 inch thick and had the following electrical properties:

TABLE 1

| Sample (C) | 25° C | 140° C | 150° C |
|---|---|---|---|
| Power Factor (60 Hz) 100 × tan δ | 3.6% | 4.4% | 23.0% |
| Dielectric Constant ε | 3.6 | 4.5 | 5.6 |

These values are acceptable under a minimal cure temperature of 135° C.

Sample (C) was then placed in an oven and post cured at 150° C for 5 hours. Sample (C) then had the following electrical properties:

TABLE 2

| Sample (C) | 125° C | 150° C |
|---|---|---|
| Power Factor (60 Hz) 100 × tan δ | 2.9% | 14.0% |
| Dielectric Constant ε | 3.9 | 5.1 |

For high voltage usage, on 0.125 inch samples, power factors below about 20% at 150° C are acceptable. These values would indicate that mica tape impregnated with this solventless impregnating composition, containing 0.30 parts polyester per part styrene, would provide a very good insulation for conductors and coils in high voltage electrical apparatus. It is felt that the lower limit in this regard would be 0.20 part polyester per 1 part styrene.

A variety of other ingredients could be substituted for the materials used in the example with equally good results. For example vinyl toluene could be substituted for styrene. Other pure polyesters, i.e., not containing substantial amounts of various additives could be substituted for the bisglycol-fumaric acid polyester. Also, other peroxides, azo compounds and quinone compounds could be used as described hereinabove.

EXAMPLE 2

An epoxy-styrene-polyester solventless resin impregnating composition was prepared. A two component epoxy resin system was first made by mixing 3.25 parts solid bisphenol A epoxy having an E.EQ.WT. of about 475-575, (DER 661) was mixed with 6.75 parts liquid bisphenol A epoxy having an E.EQ.WT. of about 185-192 (EPON 828). To this was added 8 parts of liquid styrene vinyl monomer, to provide a ratio of solid epoxy to liquid epoxy of 1:2.08 and a ratio of reactive vinyl monomer to total epoxy of 0.8 to 1.

The resins were maintained at 25° C. Then, to the 18 parts of combined solid-liquid epoxy resin and styrene was added 5.9 parts of liquid Nadic methyl anhydride of about 99.5% purity; 0.048 part of 2,5 dimethyl-2,5-bis (benzoyl-peroxy hexane) reaction catalyst; and 0.002 part of tertiary butyl hydroquinone reaction inhibitor.

To four 23.9 part samples of this cold blended admixture was added, at 25° C: 1.2 parts, 2.4 parts, 3.6 parts and 4.8 parts of a solid polyester of bisglycol and fumaric acid (Atlac 382) to form samples (D), (E), (F) and (G) respectively. Sample (D) contained about 4.76 wt.% polyester, sample (E) contained about 9.15 wt.% polyester, sample (F) contained about 13.1 wt.% polyester and sample (G) contained about 16.7 wt.% polyester. The weight ratio of polyester: styrene was 0.15:1; 0.30:1; 0.45:1 and 0.6:1 for samples (D), (E), (F) and (G) respectively. The viscosity of each of the samples was about 200 cps at 25° C.

Fifteen grams of each sample was poured into aluminum cups, gelled and baked in an oven at a minimal cure temperature of 135° C for about 10 hours. Sample (D) was cloudy and brittle, sample (E) was slightly cloudy and somewhat brittle, sample (F) was clear and tough and sample (G) was clear and tough. Again, these results indicate that 0.30 part polyester per part styrene will provide adequate cross-linking between all the components of the system.

Sample (F), containing 0.45 part polyester per part styrene, was about 0.125 inch thick and had the following electrical properties after a post cure at 150° C for 5 hours:

TABLE 3

| Sample (F) | 150° C |
|---|---|
| Power Factor (60 Hz) 100 × tan δ | 8.1% |
| Dielectric Constant ε | 4.9 |

For high voltage usage, on 0.125 inch samples, power factors below about 10% at 150° C are considered excellent. Sample (F) containing more polyester than sample (C) had even better high voltage electrical properties than sample (C) after final cure. It is felt that the upper limit in this regard would be 1.0 part polyester per 1 part styrene.

Storage properties, as shown by the change in viscosity of the epoxy-styrene-polyester impregnating composition of sample (F) were measured. Small portions of sample (F) were placed in glass jars at 25° C and remained at a viscosity of about 200 cps to 300 cps for about 90 to 120 days. After 120 days the composition began to react and finally reached a semi-solid gel at about 2,000,000 cp at 25° C. It had completely gelled by 8 months. These results indicate a useful shelf life of at least 4 months for this resin system.

The sample (F) epoxy-styrene-polyester resin system was used to impregnate 2,300 volt, form wound coils, prepared similar to those shown in FIG. 2 of the drawings. The ground insulation 16 consisted of three half lapped layers of 7 mil mica flake tape impregnated with the sample (F) resin system. The outer wrapping 21 consisted of a layer of glass fiber tape. The liquid resinous binder holding the mica 20 to the backing 18 was a blend of 85 parts of a bisphenol A epoxy resin with an E.EQ.WT. of about 240–285 and 15 parts of triallyl cyanurate. The mica tape wound coil was given one vacuum impregnation with the sample (F) resin system which provided an exceptionally good resin pickup. The impregnated coil was baked for 11 hours at 175° C to completely cure the resin system. The electrical properties were found to be very good. The power factor (100 tan δ) of the composite insulation was 14% at 150° C.

I claim:

1. The method of making a liquid resinous composition from a liquid-solid epoxy resin mixture, liquid Nadic methyl anhydride, a liquid unsaturated reactive vinyl monomer, a polyester, a reaction catalyst, and reaction inhibitor, said liquid composition having a long catalyzed shelf life, said method comprising: forming an unreacted admixture, at a temperature of between about 20° C to 35° C, consisting essentially of: (a) a mixture of 1 part of an epoxy resin combination, consisting of a liquid epoxy resin having an epoxy equivalent weight of between about 150 to 300 and a solid epoxy resin having an epoxy equivalent weight of between about 325 to 2,500, wherein the weight ratio of solid epoxy:liquid epoxy is between about 1:0.3 to 1:9, and about 0.4 to 1.4 parts of a liquid unsaturated reactive vinyl monomer, (b) about 0.3 to 0.7 part of liquid Nadic methyl anhydride, (c) about 0.2 to 1.0 part of a polyester resin for each 1 part of liquid unsaturated monomer, (d) an amount of a free radical reaction catalyst effective to promote a gelling effect to the resinous composition at temperatures over about 85° C and (e) an amount of a reaction inhibitor that is effective to react with the free radicals of the reaction catalyst to prevent reaction catalization of the polyester and the liquid unsaturated monomer at the admixing temperature of between about 20° C to 35° C, wherein the resinous composition has a viscosity of between about 50 cps to 2,500 cps at 25° C and is characterized by having an atmospheric catalyzed shelf life of at least 45 days at 25° C.

2. The method of claim 2, wherein the liquid unsaturated monomer is free of functional groups reactive with the epoxy resin and the epoxy resins are selected from the group consisting of epoxy novolacs and diglycidyl ethers of bisphenol A.

3. The method of claim 2, wherein the reaction catalyst is selected from the group consisting of azo compounds and peroxide compounds added in the amount of between about 0.002 to 0.010 part for each 1 part of liquid unsaturated monomer, the reaction inhibitor is a quinone compound added in the amount of between about 0.0001 to 0.0010 part for each 1 part of liquid unsaturated monomer, and the epoxy resins are diglycidyl ethers of bisphenol A.

4. The method of claim 2 wherein the liquid unsaturated monomer is selected from the group consisting of styrene, vinyl toluene, and mixtures thereof.

5. A fluid, solventless, impregnating composition having a viscosity of between about 50 cps to 2,500 cps at 25° C and a long room-temperature shelf life, said composition consisting essentially of an unreacted admixture, at a temperature of between about 20° C to 35° C, of the following ingredients: (a) a mixture of 1 part of an epoxy resin combination, consisting of a liquid epoxy resin having an epoxy equivalent weight of between about 150 to 300 and a solid epoxy resin having an epoxy equivalent weight of between about 325 to 2,500, wherein the weight ratio of solid epoxy:liquid epoxy is between about 1:0.3 to 1:9, and about 0.4 to 1.4 parts of a liquid unsaturated reactive vinyl monomer, (b) about 0.3 to 0.7 part Nadic methyl anhydride, (c) about 0.2 to 1.0 part of a polyester resin for each 1 part of liquid unsaturated monomer, (d) an amount of a free radical reaction catalyst effective to promote a gelling effect to the resinous composition at temperatures over about 85° C and an amount of a reaction inhibitor that is effective to react with the free radicals of the reaction catalyst to prevent reaction catalization of the polyester and the liquid unsaturated monomer at the admixing temperature of between about 20° C to 35° C, said composition characterized by having an atmospheric catalyzed shelf life of at least 45 days at 25° C.

6. The composition of claim 5, wherein the liquid unsaturated monomer is free of functional groups reactive with the epoxy resin and the epoxy resins are selected from the group consisting of epoxy novolacs and diglycidyl ethers of bisphenol A.

7. The method of claim 6, wherein the reaction catalyst is selected from the group consisting of azo compounds and peroxide compounds added in the amount of between about 0.002 to 0.010 part for each 1 part of liquid unsaturated monomer, the reaction inhibitor is a quinone compound added in the amount of between about 0.0001 to 0.0010 part for each 1 part of liquid unsaturated monomer, and the epoxy resins are diglycidyl ethers of bisphenol A.

8. The method of claim 6, wherein the liquid unsaturated monomer is selected from the group consisting of styrene, vinyl toluene, and mixtures thereof.

* * * * *